*INVENTORS*
GEO. B. HILL & LEO CHEATUM
BY
*ATTORNEYS*

Patented Feb. 20, 1951

2,542,250

UNITED STATES PATENT OFFICE 2,542,250

BLOWER TYPE CONVEYER WITH DETACHABLE FEEDING UNIT

George B. Hill and Leo Cheatum, Ottumwa, Iowa, assignors to Deere Manufacturing Co., a corporation of Iowa Application May 8, 1947, Serial No. 746,684

9 Claims. (Cl. 302—37)

The present invention relates generally to blower type conveyors for elevating comminuted material, such as chopped ensilage or hay, into a silo or hay mow. Elevators of this class are usually provided with a feeder unit into which the chopped crops can be unloaded from the wagon or truck, the feeder unit being adapted to convey the crops into the intake of the blower. Inasmuch as it is customary to unload wagons and trucks by raising the front end and dumping the material out of the rear end of the body, it is customary to mount the feeder unit so that it can be swung either horizontally or vertically out of the path of the vehicle to permit the latter to move forwardly into dumping position and then swing the feeder unit back into normal receiving position behind the vehicle, thus avoiding the necessity for backing the wagon or truck into position.

The principal object of the present invention relates to the provision of a feeder unit which is shiftable longitudinally relative to the blower between a normal operating position adjacent the blower and an inactive position remote from the blower to permit the passage of the vehicle.

Another object relates to the provision of disengageable power transmitting means for driving the feeder unit from the elevating device, which is quickly engageable as the feeder unit is rolled into operating position. A further object relates to the provision of disengageable latch means for securing the feeder unit to the elevating device during operation.

Still another object relates to the provision of a speed reduction mechanism for driving the feeder at an appreciably lower speed than that of the blower.

Still a further object relates to the provision of manual controls at the outer end of the feeder unit for disconnecting the feeder from the source of power and also for unlatching the feeder unit from the elevator.

These and other objects and advantages of the present invention will be apparent to those skilled in the art after a consideration of the following description and the drawings appended hereto, in which Figures 1 and 2 are respectively a top plan view and a side elevational view of a blower elevator with a feeder unit attached thereto in normal operating position;

Figure 1:
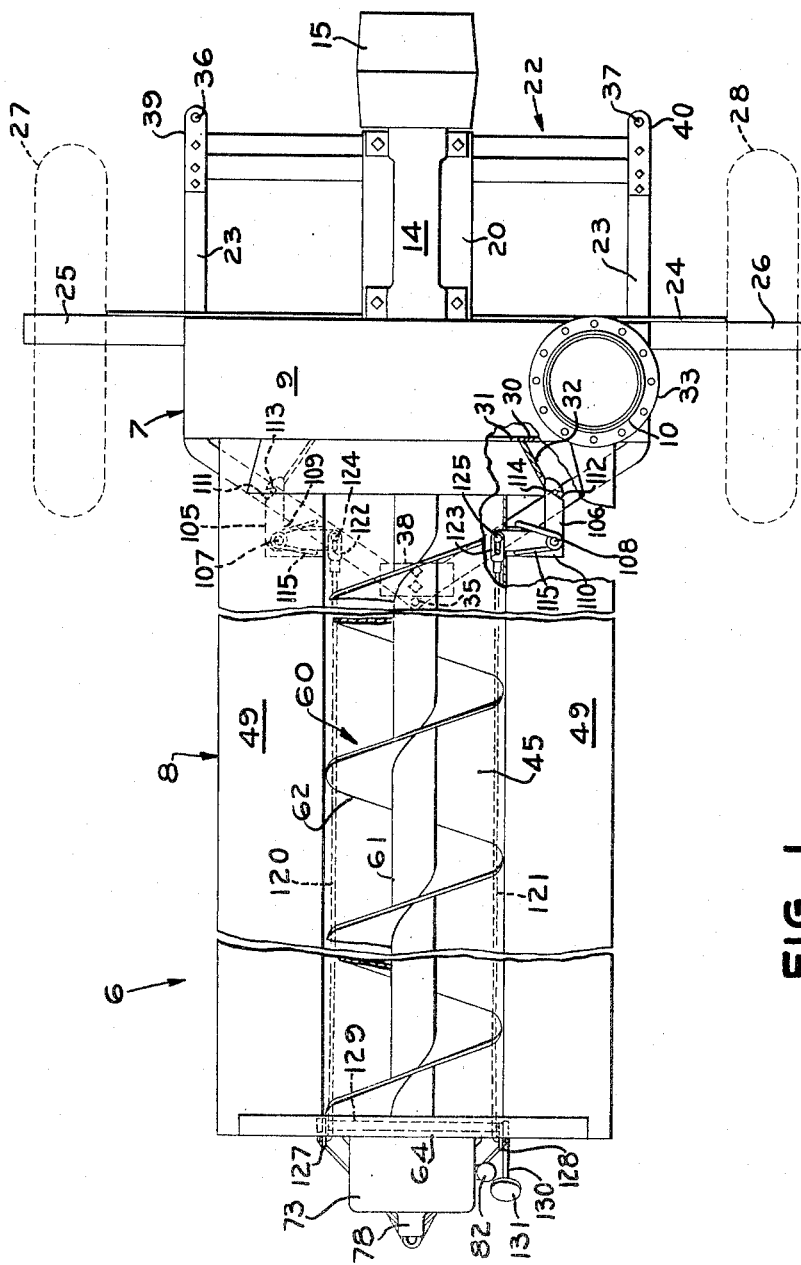

Referring now to the drawings, the machine is indicated in its entirety by reference numeral 6 and comprises a crop handling device 7 and a feeder unit 8. The crop handling device 7 comprises a blower housing 9, generally cylindrical in shape and having a tangentially extending exhaust duct 10 extending upwardly therefrom. A blower rotor 11 is rotatably disposed within the housing 9 and is provided with a hub 12 which is mounted on a rotor shaft 13. The shaft 13 extends through one side wall of the housing 9 and is journalled within a bearing sleeve 14, projecting through the latter to support a drive pulley 15 at its opposite end.

The bearing sleeve 14 is mounted on a supporting plate 20 which is carried on a superstructure 21, mounted on a generally horizontal frame 22. The frame 22 comprises a pair of laterally spaced longitudinally extending members 23 which converge toward the forward end of the machine beneath the feeder unit 8. A transverse angle member 24 extends beneath the housing 9 and carries a pair of stub axles 25, 26 at opposite ends thereof, respectively, and preferably welded rigidly thereto. The axles 25, 26 are adapted to receive transport wheels 27, 28 for transport purposes, but which are removed before the machine is set up for operation and therefore are indicated in dotted lines in the drawings.

The side wall 30 on the side of the housing 9 opposite the bearing sleeve 14 is provided with an intake opening 31, around which is mounted a flared flange 32. The rotation of the rotor 11 draws in air through the opening 31, together with any material, such as chopped hay or other crops, and discharges upwardly through the discharge duct 10.

An extension pipe (not shown) can be attached to a supporting flange 33 on the upper end of the discharge duct 10, for the purpose of leading the crops into a silo or hay mow, or the like. During operation, the blower unit 7 is anchored to the ground by means of anchor stakes (not shown) driven through apertures 35, 36, 37 in plates 38, 39, 40, fixed as by bolting to the ends of the frame members 23.

The feeder unit 8 comprises a hemicylindrical trough 45 mounted on a supporting frame 46 including longitudinal frame members 47 and a plurality of upwardly diverging frame members 48. A pair of upwardly diverging side walls 49 are fixed, as by bolts 50, to the frame members 48 and are provided along their upper edges with tubular rail members 51. A transverse axle member 52 is fixed beneath the frame 46 and is carried on a pair of laterally spaced supporting wheels 53, 54, journaled on the axle 52. A centrally disposed caster wheel 55 is mounted directly beneath the trough 45 on a castering fork 56 supported on the framework 46.

Disposed within the trough 45 is a conveyor auger 60 comprising a hollow shaft 61 around which is wound a helical auger blade 62. The outer end of the hollow shaft 61 is journaled in a suitable bearing 63 on the end wall 64 of the trough 45. The opposite or inner end of the tubular shaft 61 adjacent the opening 31 is provided with a flared mouth 65 adapted to pilot and receive the outer end of the rotor shaft 13.

A drive shaft 70 is carried at its inner end in an antifriction bearing 71 within the tubular shaft 61 adjacent the inner end of the latter, and the outer end of the drive shaft 70 is journaled in a bearing 72 beyond the outer end of the tubular shaft 61 and mounted in a gear housing 73, rigidly attached to the outer side of the end wall 64 of the trough 45.

The drive shaft 70 is connected to drive the outer end of the tubular shaft 61 through a train of gears disposed within the gear casing 73, and comprising a drive gear 75 fixed to the drive shaft 70 and in mesh with a second gear 76 of larger diameter, mounted on a countershaft 77, which is journaled in a pair of bearings 78, 79 in the gear casing 73. The countershaft 77 is splined to receive a shiftable gear 80 adapted to mesh with a larger diameter gear 81 attached to the outer end of the tubular shaft 61. The gear 80 is shifted on the splined shaft 77 into and out of engagement with the gear 81 by means of a manually controlled lever 82 attached to a shaft 83 mounted in the gear casing 73 and which carries a shifting fork 84 engaging a peripherally grooved collar 85 attached to the gear 80. By swinging the control lever 82 to the right, as viewed in Figure 2, the gear 80 is shifted into mesh with the gear 81, thereby transmitting power from the drive shaft 70 through the first gear reduction comprising the meshing gears 75, 76 and then through the second gear reduction comprising the gears 80, 81, thus driving the auger 60 at a speed considerably slower than that of the fan rotor 11.

The inner end of the drive shaft 70 is tapered to a point 90 which is adapted to inter-fit with a pilot socket 91 in the end of the rotor shaft 13. When the feeder unit 8 is pushed up to the blower housing 7 the socket 91 forms a support for the inner end of the drive shaft 70. Power is transmitted from the shaft 13 to the drive shaft 70 through a pair of jaw clutches 92, 93. The clutch element 92 is in the form of a sleeve rigidly secured to the end of the shaft 13 by means of a pin 94 extending diametrically through the sleeve and shaft. The sleeve element 92 is provided with a series of clutch teeth 95 in the outer edge of the sleeve, adapted to mesh with a similar series of teeth 96 in the adjacent edge of the clutch element 93, which is in the form of a sleeve slidable axially on the end of the shaft 70, but prevented from rotation relative thereto by means of a pair of set screws 97 secured within the sleeve 93 and projecting into engagement with grooves 98 extending longitudinally in the surface of the shaft 70. A helical compression spring 99 encircles the shaft 70 between the sleeve 93 and the bearing 71 and serves to urge the clutch element 93 into meshing engagement with the teeth 95 of the sleeve element 92. A ring 100 is rigidly fixed within the tubular shaft 61 on the opposite side of the bearing 71 from the spring 99 and serves to resist the pressure of the spring.

Figures 2, 3:
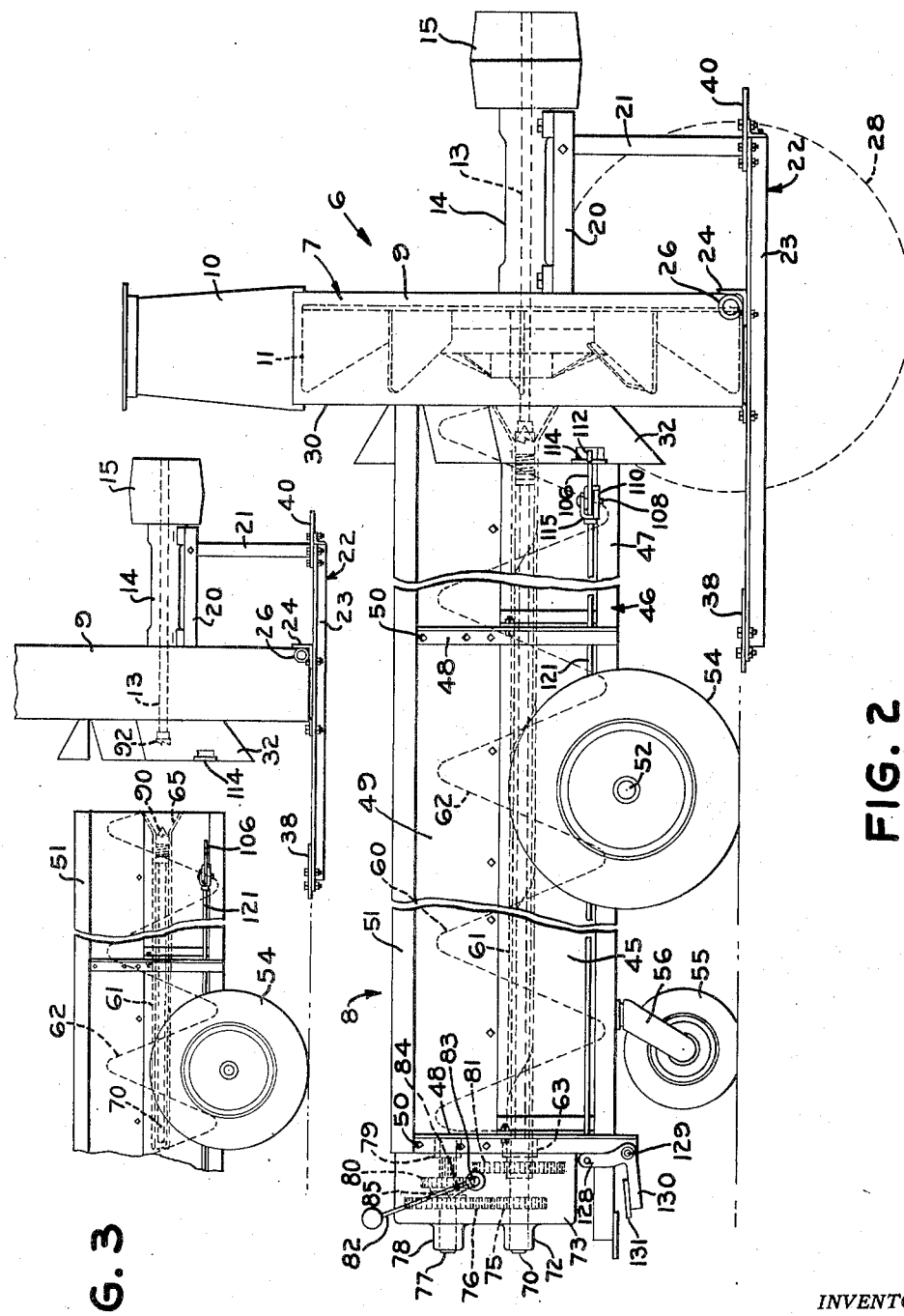
Figure 3 is a fragmentary side elevational view drawn to a reduced scale and showing the feeder unit withdrawn from the elevator.
Figure 5:
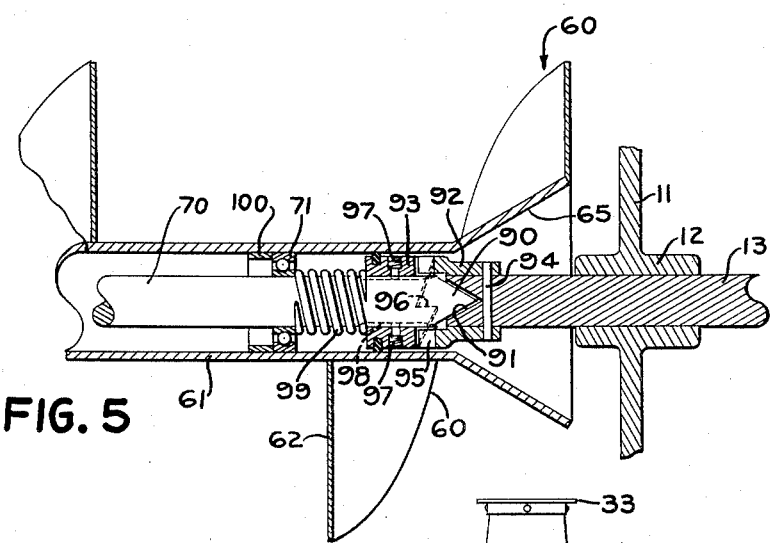
Figure 5 is a sectional view taken through a portion of the auger along the axis thereof, showing the power transmitting connection with the rotor shaft, and drawn to an enlarged scale.
Figure 4:
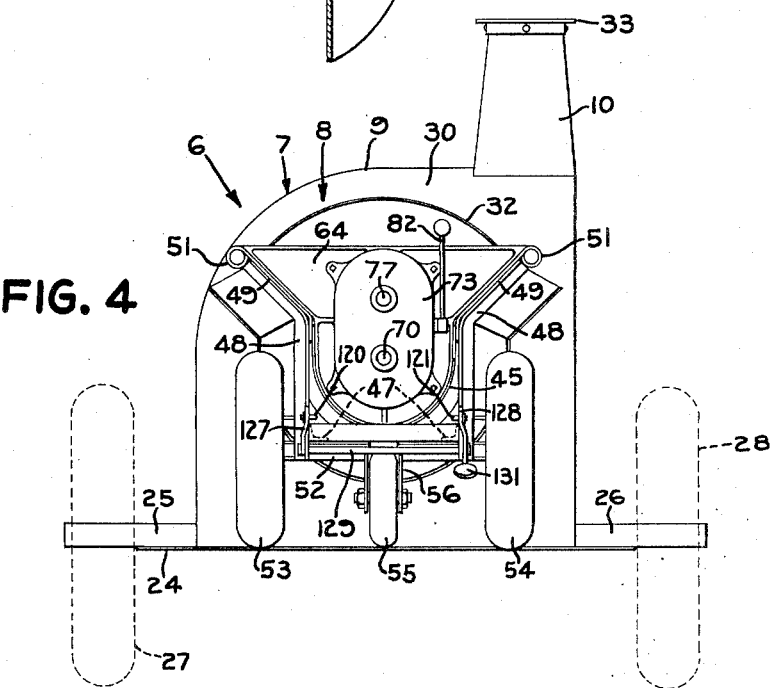
Figure 4 is an end elevational view looking toward the outer end of the feeder unit.

It will now be evident that the feeder unit 8 is adapted to be shifted longitudinally toward and away from the elevator housing 9. When a loaded wagon is brought up to be unloaded into the feeder 8, the latter is pulled longitudinally away from the feeder housing 7, as illustrated in Figure 3, to provide a space wide enough for the wagon to pass through. The wagon then stops with its tail gate in line with the blower and the feeder unit 8 is then rolled under the tail gate of the wagon until the inner end of the trough 45 is piloted and received within the flared flange 32, and at the same time the flared opening 65 in the end of the tubular shaft 61 receives or pilots the clutch element 92 on the rotor shaft 13 and guides the clutch element 92 into mesh with the other clutch element 93, and also guides the point of the drive shaft 70 into the socket 91 in the rotor shaft 13. The shiftable clutch element 93 is adapted to yield axially away from the rigid clutch element 92, in case the jaw teeth 95, 96 do not immediately slide into full mesh with each other. The pressure of the spring 99, however, causes the teeth to be forced into proper meshing relation.

When the feeder unit 8 is in operating position it is desirable to prevent any accidental movement thereof away from the blower unit. For this purpose, the feeder unit is provided with a pair of latch elements in the form of bell cranks 105, 106 disposed on relatively opposite sides of the trough 45 and pivotally mounted at 107, 108, respectively, on brackets 109, 110, respectively. The bell cranks 105, 106 are provided with notched ends 111, 112 adapted to engage apertures 113, 114 in opposite edges of the opening flange 32 in the housing 9. Each of the latch elements 105, 106 is provided with a spring 115 mounted on the pin 108 and engaging the associated arm and its supporting bracket to bias the latch element into latching engagement with the flange 32.

A pair of operating rods 120, 121 extend axially along opposite sides of the trough 45, respectively, and are provided with slotted clevises 122, 123 connected by pins 124, 125 to the inner ends of the bell cranks 105, 106, respectively. The actuating rods 120, 121 extend behind the vertical frame members 48 and are connected at their outer ends to a pair of arms 127, 128, respectively, fixed to a rockshaft 129 disposed transversely beneath the outer end of the trough 45 and supported at opposite ends thereof, respectively, in the lower ends of the two outer vertical frame members 48. One of the arms 128 is formed integrally with a horizontally extending lever 130, on which is fixed a foot pedal 131. An operator standing at the outer end of the feeder unit steps on the pedal 131 to disengage the latch elements 105, 106 from the flange 32 before he pulls the feeder unit 8 longitudinally away from the blower housing 9 to permit the passage of a wagon therebetween.

The operation of this machine can be summarized as follows. The rotor 11 of the blower is driven through a suitable belt (not shown) from an engine or electric motor, the belt being trained around the pulley 15 on the rotor shaft 13. The rotor shaft 13 drives the drive shaft 70 through the engaging clutch elements 92, 93, which in turn drives the auger 60 through the double reduction gearing in the casing 73. The material dumped into the trough 45 and between the hopper walls 49 is carried by the auger into the opening 31 in the housing 9, where it is propelled by the blower rotor 11 upwardly through the discharge duct 10. When the first wagon is empty it is removed and a loaded wagon is brought up. The operator steps on the pedal 131 to release the latch elements 105, 106 and pulls the feeder unit 8 longitudinally on its wheels 53, 54, 55 away from the housing 9, thus separating the jaw clutch elements 92, 93 to disengage the shafts 13, 70. The loaded wagon is then moved beyond the feeder unit 8 which is thereupon pushed back into operating position, and held therein by the latch elements. The clutch elements 92, 93 are thus reengaged, making it possible for the auger 69 to rotate once more. The machine is then ready for elevating the new wagon load of material.

The feeder auger 69 can be stopped at any time by swinging the control lever 82 to disengage the gears 80, 81.

We claim:

1. A conveyor comprising a blower adapted to stand stationary upon the ground during normal operation and including a rotatable member, a feeder unit including a trough for receiving material and an auger rotatable within said trough for delivering the material to said blower, wheel means for supporting said trough on the ground and providing for rolling said trough away from said blower to permit passage of a vehicle through the space normally occupied by the trough; a pair of disengageable clutch elements connected with said rotatable member and said auger, respectively, for driving said auger from said member and adapted to be disengaged by movement of said trough away from said blower, and a pair of cooperative latch elements mounted on said feeder unit and said blower, respectively, for holding the same together during operation, said elements being readily disengageable to permit said rolling movement of said feeder unit away from said blower.

2. The combination set forth in claim 1, including the further provision of a rockable member mounted at the outer end of said trough, and means extending along said trough connecting said rockable member with one of said latch elements for disengaging the latter by rocking said rockable member.

3. A conveyor comprising a blower adapted to stand stationary upon the ground during normal operation and including a rotatable member, a feeder unit including a trough for receiving material and an auger rotatable within said trough for delivering the material to said blower, wheel means for supporting said trough on the ground and providing for rolling of said trough away from a feeding position adjacent said blower to permit passage of a vehicle through the space normally occupied by the trough, said auger comprising a hollow shaft and a helical vane mounted thereon and having an inner end portion proximate to the blower when the trough is in feeding position, a drive shaft extending axially through said hollow shaft and having inner and outer end portions respectively adjacent inner and outer end portions of the hollow auger shaft, means interconnecting the outer ends of said hollow shaft and drive shaft, a pair of disengageable clutch elements mounted on said rotatable member and the inner end of said drive shaft, respectively, for driving said drive shaft from said member and adapted to be disengaged by movement of said trough away from said blower, and means at the inner end of the hollow auger shaft for piloting re-engagement of the clutch elements when the trough is returned to the blower.

4. A machine of the class described, comprising: a first unit in the form of a material-handling device normally self-sustained on the ground or a floor; a second unit in the form of a feeder for receiving material from a material-unloading vehicle and for transferring such material to the first unit; means sustaining the second unit on the ground or a floor and carrying said second unit for movement over such ground or floor relative to the fixed first unit for selective positioning thereof in either a first position, wherein the two units are proximate to each other and in crop-transfer relation, or a second position in which the units are each self-sustained in widely separated relationship so that a space is provided therebetween for the passage of a material-unloading vehicle; first and second drive members carried respectively by and as integral components of the units, said members being proximate to each other in the aforesaid first position of the units and separated and widely spaced on the order of the aforementioned spacing when the second unit is moved to its second position; and normally connected coupling elements carried respectively by the members and constructed and arranged for disconnection and separation when the units are separated and for automatic re-connection when the second unit is returned to its first position.

5. The invention defined in claim 4, further characterized in that: first and second normally connected latches are provided respectively on the units for retaining the units in said first position, one of said latches including means providing for disconnection thereof from the other when the units are separated and for automatic reconnection thereof when the second unit is returned to its first position.

6. The invention defined in claim 4, further characterized in that: first and second normally connected latches are provided respectively on the units for retaining the units in said first position, one of said latches including means providing for disconnection thereof from the other; and control means on the second unit and having an operating connection with one of the latches for disconnection of the latches so that the units may be separated, said latches being constructed and arranged for automatic re-connection thereof when the second unit is returned to its first position.

7. The invention defined in claim 4, further characterized in that: the first unit has a material inlet and the second unit has a material outlet, said inlet and outlet being alined in crop-transfer relationship in the first position of the units and being separated in the second position of the units; and pilot means on one unit effective to guide the inlet and outlet for re-alinement upon return of the second unit to its first position.

8. The invention defined in claim 4, further characterized in that: the drive member of the first unit includes a rotatable part and the drive member of the second unit includes a rotatable part normally coaxial with each other on a line lengthwise of the path of separation of the units; and said coupling elements are likewise coaxially arranged and provided with pilot means for facilitating re-connection thereof when the second unit is returned to its first position.

9. The invention defined in claim 8, further characterized in that: the rotatable part of the second unit includes an auger coaxial with the first-unit rotatable part; said auger has a coaxial hollow shaft portion proximate to the first-unit coupling element; the second unit coupling element is within the hollow shaft portion; and the hollow shaft portion has a flared mouth for receiving the first-unit coupling element to pilot re-connection of the elements when the second unit is returned to its first position.

GEORGE B. HILL.
LEO CHEATUM.

REFERENCES CITED

The following references are of record in the file of this patent:

FOREIGN PATENTS

| Number | Country | Date |
| --- | --- | --- |
| 189,039 | Great Britain | Nov. 23, 1922 |